United States Patent
Anikhindi et al.

(10) Patent No.: US 6,687,307 B1
(45) Date of Patent: Feb. 3, 2004

(54) LOW MEMORY AND LOW LATENCY CYCLIC PREFIX ADDITION

(75) Inventors: Santosh Anikhindi, San Jose, CA (US); Vincent K. Jones, IV, Redwood City, CA (US)

(73) Assignee: Cisco Technology, INC, San Jose, CA (US)

( * ) Notice: Subject to any disclaimer, the term of this patent is extended or adjusted under 35 U.S.C. 154(b) by 0 days.

(21) Appl. No.: 09/513,719

(22) Filed: Feb. 24, 2000

(51) Int. Cl.[7] .............................................. H04L 27/28
(52) U.S. Cl. ........................ 375/260; 375/295; 455/59
(58) Field of Search ................................. 375/259, 260, 375/295, 279, 284, 285, 308, 340, 346, 348; 370/203, 210, 480, 509, 510, 206, 276, 344; 455/59, 60

(56) References Cited

U.S. PATENT DOCUMENTS

| | | | | |
|---|---|---|---|---|
| 5,668,802 A | * | 9/1997 | Chalmers et al. ............ 370/276 |
| 5,732,068 A | | 3/1998 | Takahashi et al. ........... 370/206 |
| 6,473,418 B1 | * | 10/2002 | Laroia et al. ................. 370/344 |
| 6,487,258 B1 | * | 11/2002 | Jedwab et al. ............... 375/340 |
| 6,549,581 B1 | * | 4/2003 | Izumi ........................... 375/260 |

* cited by examiner

Primary Examiner—Chieh M. Fan
(74) Attorney, Agent, or Firm—Ritter, Lang & Kaplan LLP (57) ABSTRACT

Systems and methods for appending cyclic prefixes to OFDM bursts while employing minimal additional memory and adding minimal latency are provided. This facilitates lower cost implementations of OFDM communication systems including systems that carry real time traffic such as telephony and video conferencing. The phases of frequency domain symbols are rotated prior to application of the IFFT so that cyclic prefix addition may be implemented as cyclic postfix addition. Cyclic postfix addition requires much less memory and imposes much less latency then cyclic prefix addition.

15 Claims, 7 Drawing Sheets

LOW MEMORY AND LOW LATENCY CYCLIC PREFIX ADDITION

BACKGROUND OF THE INVENTION

The present invention relates to systems employing multi-tone modulation such as, e.g., OFDM digital communication systems.

Orthogonal Frequency Division Multiplexing (OFDM) is an increasingly important technique in digital communications. OFDM provides excellent performance in communication environments where a signal takes multiple paths from a transmitter to a receiver. OFDM finds application in both wireless environments and wireline environments such as digital subscriber line (DSL) applications. Some OFDM implementations in the DSL environment are referred to as discrete multi-tone (DMT).

In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT (Inverse Fast Fourier Transform) is applied to a series of frequency domain symbols to be simultaneously transmitted, a "burst." The frequency domain symbols are also referred to as tones.

For this reason, OFDM is sometimes referred to as multitone modulation. The resulting series of time domain symbols is augmented with a cyclic prefix prior to transmission. The cyclic prefix is a duplicate of the last v time domain symbols of the time domain burst. The cyclic prefix addition process may be characterized by the expression:

$$[z(1) \ldots z(N)]^T \rightarrow [z(N-v+1) \ldots z(N)z(1) \ldots z(N)]^T$$

Figure 1:
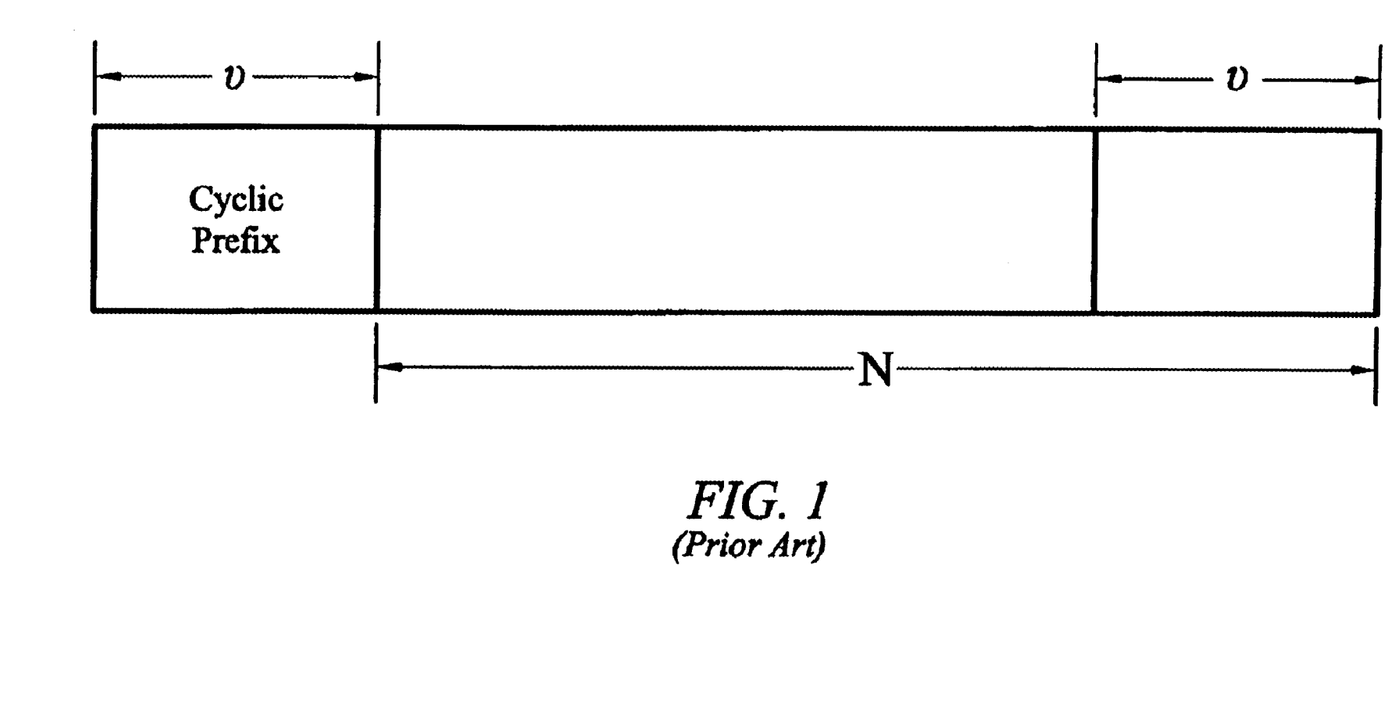
FIG. 1 depicts an OFDM burst with a cyclic prefix.

On the receive end, the cyclic prefix is removed from the time domain bursts. An FFT is then applied to recover the simultaneously transmitted frequency domain symbols. The cyclic prefix length v is greater than or equal to a duration of the impulse response of the overall channel. Use of the cyclic prefix assures orthogonality of the frequency domain subchannels in the multipath environment. FIG. 1 depicts an N symbol long time domain burst with a v length cyclic prefix that duplicates the last v symbols of the time domain burst.

Figure 2:
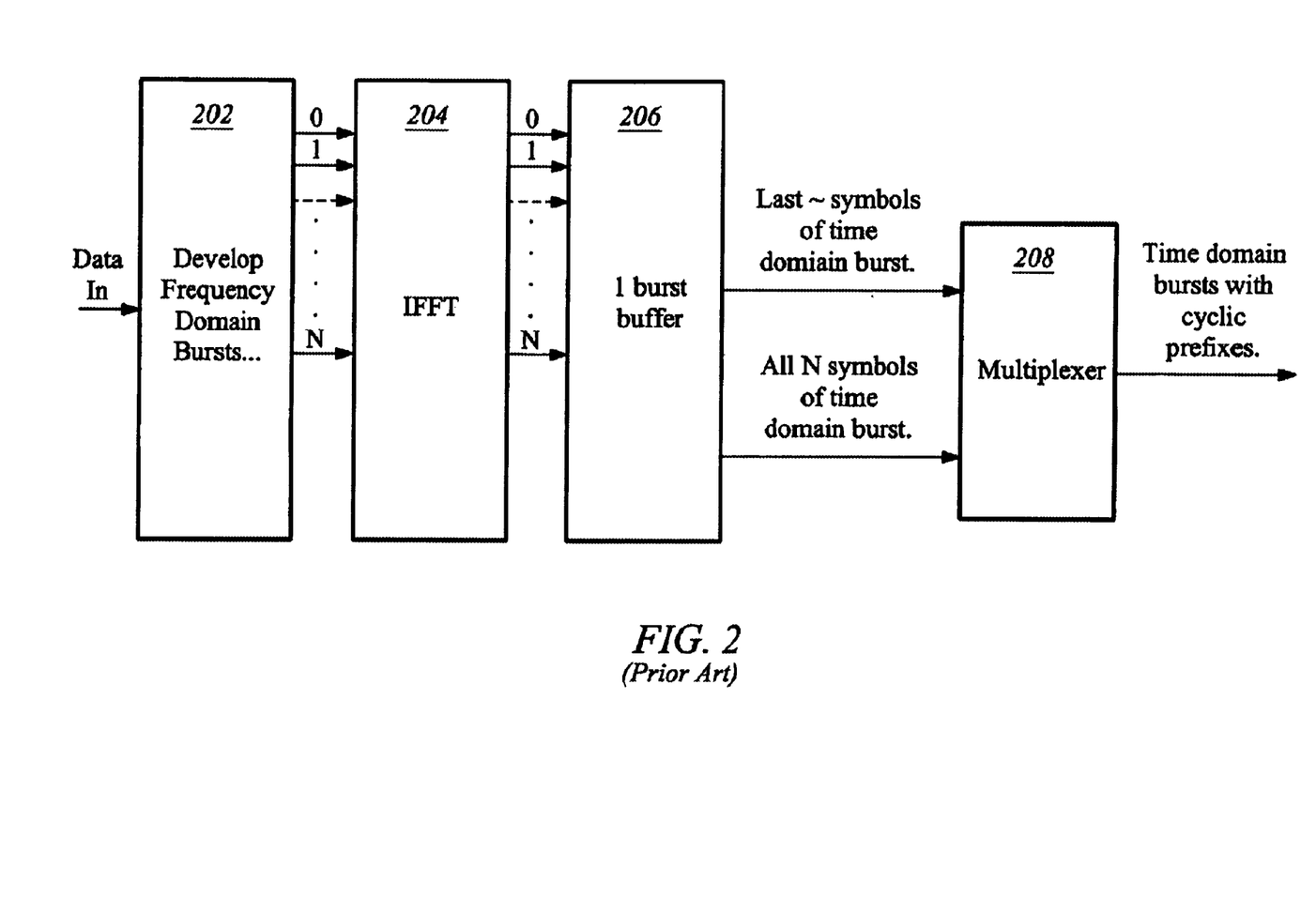
FIG. 2 depicts an OFDM transmitter system.

FIG. 2 depicts a prior art OFDM transmitter system. A frequency domain burst development block 202 receives data as input and outputs frequency domain symbols. This block includes, for example, error correction coding, interleaving, and bit to symbol mapping as are known in the art. Block 202 generates a series of N symbol long bursts of frequency domain symbols. An IFFT block 204 accepts such bursts and transforms them into the time domain using the IFFT procedure. A buffer 206 receives each time domain burst as it is generated by block 204 and stores it for N symbols periods, i.e., a burst. The cyclic prefix is appended to each burst by the operation of a multiplexer 208. After N−v symbols of the burst have been loaded into buffer 206, multiplexer 208 selects input from buffer 206 representing the last v symbols of the time domain burst to output as the cyclic prefix. Multiplexer 208 then switches to obtain all N symbols of the time domain burst in order and these are output after the cyclic prefix is output.

Problems arise in the practical implementation of the scheme of FIG. 2. Implementing buffer 206 requires a significant amount of high speed storage on the same integrated circuit that implements IFFT block 204. Furthermore, buffer 206 introduces latency lasting one burst period into the overall OFDM communications link. This additional latency may be critical in, for example, a system that is implementing real time traffic such as voice data or video conference data. What is needed are systems and methods for appending cyclic prefixes to OFDM bursts while introducing less latency and requiring less memory than previous techniques.

SUMMARY OF THE INVENTION

Systems and methods for appending cyclic prefixes to OFDM bursts while adding minimal latency and requiring minimal additional memory are provided by virtue of the present invention. This facilitates lower cost implementations of OFDM communication systems including systems that carry latency intolerant traffic such as telephony and video conferencing. The phases of frequency domain symbols are rotated prior to application of the IFFT so that cyclic prefix addition may be implemented as cyclic postfix addition. Cyclic postfix addition requires much less memory and imposes much less latency than cyclic prefix addition.

According to one aspect of the present invention, in a multi-tone transmitter, a method for developing a multitone signal includes: developing a frequency domain burst of N frequency domain symbols, phase rotating the frequency domain symbols, transforming the frequency domain symbols as phase rotated into a time domain burst, and appending to an end of the time domain burst a cyclic postfix duplicating a first v time domain symbols of the time domain burst.

A further understanding of the nature and advantages herein may be realized by reference to the remaining portions of the specification and the attached drawings.

DESCRIPTION OF SPECIFIC EMBODIMENTS

The present invention may be implemented, for example, in an OFDM communication system. A part of such an OFDM communication system will be one or more OFDM transmitters. Within each transmitter, data to be transmitted is used to modulate a carrier wave that is propagated over the airwaves or via a wire medium. The data is used to form baseband time domain symbols having complex values. These complex values then determine the amplitude and phase of the carrier wave.

Figure 3:
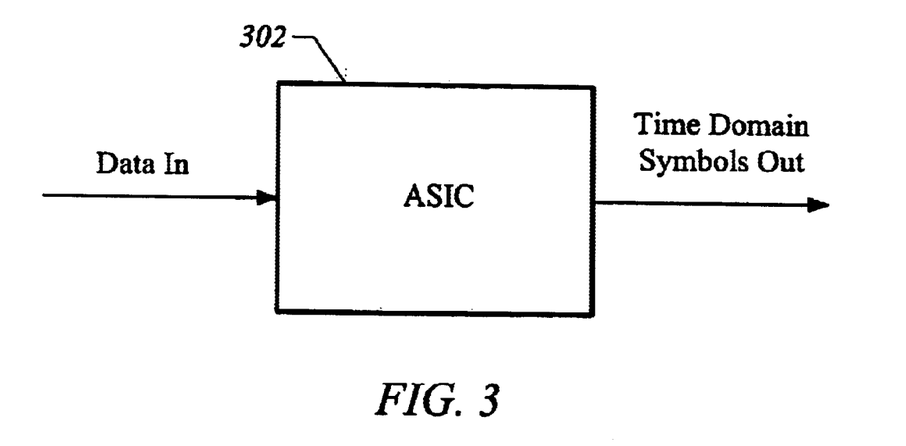
FIG. 3 depicts an ASIC system suitable for implementing one embodiment of the present invention.
Figure 4:
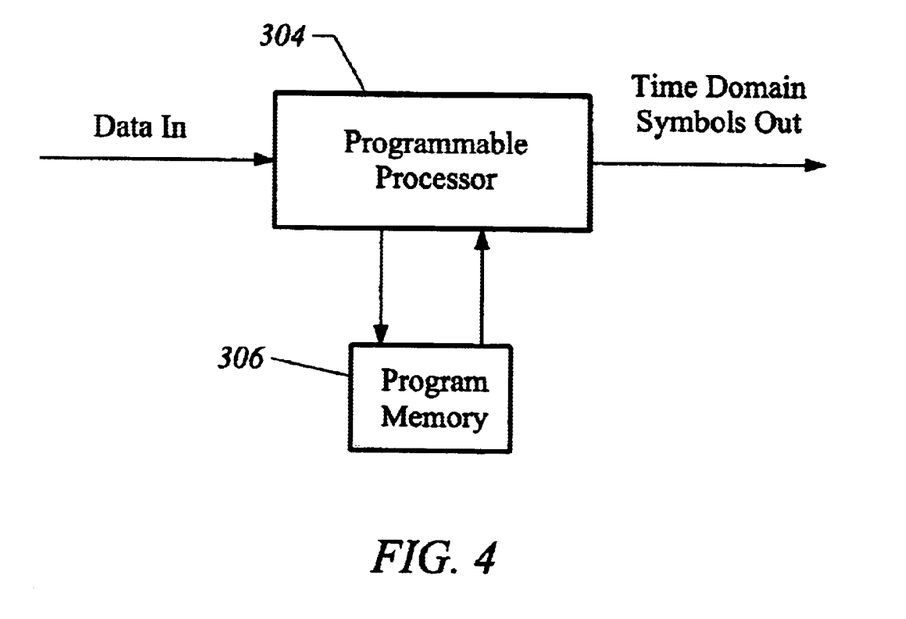
FIG. 4 depicts a programmable processor arrangement suitable for implementing one embodiment of the present invention.
Figure 5:
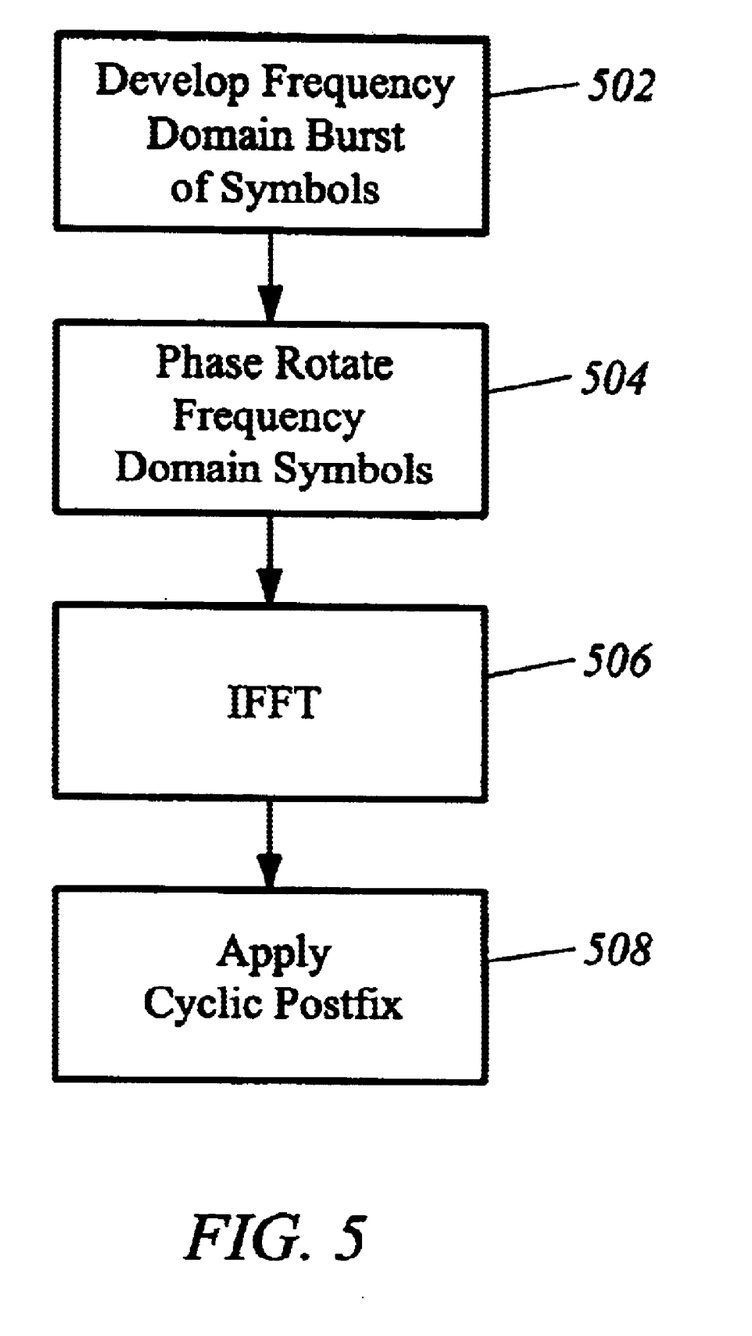
FIG. 5 is a flowchart describing steps of developing an OFDM signal according to one embodiment of the present invention.
Figure 6:
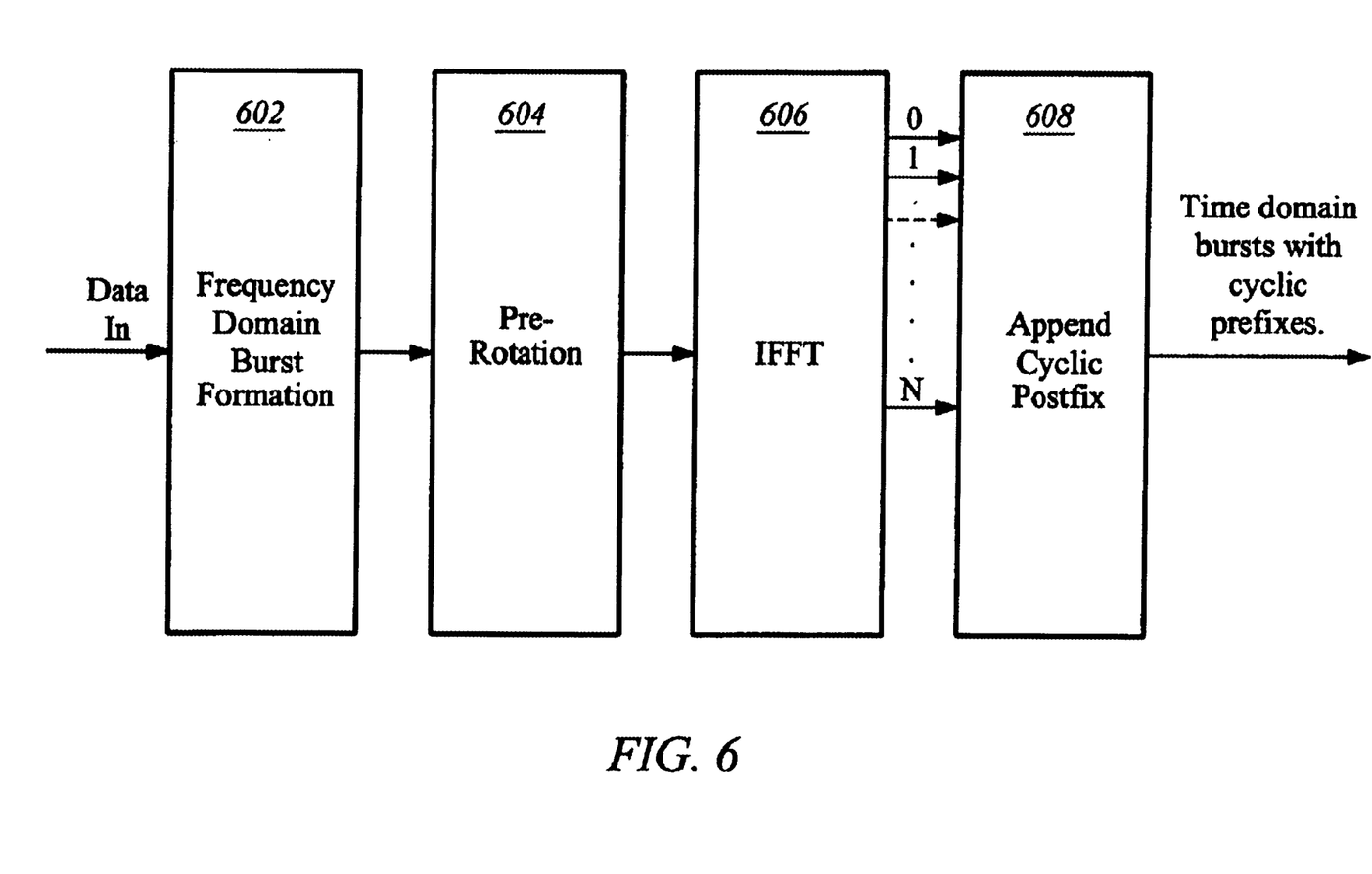
FIG. 6 is an OFDM transmitter system according to one embodiment of the present invention.

FIG. 3 depicts an application specific integrated circuit (ASIC) 302 suitable for implementing one embodiment of the present invention. ASIC 302 maps data bits to frequency domain symbols converts these symbols to the time domain, and appends the cyclic prefix. ASIC 302 may also include other signal processing functions such as error correction coding, interleaving, etc. A field programmable gate array (FPGA) or other hardware may substitute for ASIC 302. FIG. 4 depicts an alternative scheme for implementing one embodiment of the present invention. A programmable processor 304 runs software stored in a program memory 306 to perform functions essential similar to the functions performed by ASIC 302. Alternatively, these functions may be performed by some combination of an ASIC and a programmable processor. Program memory 306 is typically a short term memory. Long term storage of the software for programmable processor 304 may be in a ROM, a hard drive, a floppy disk, etc. Software may also be FIG. 5 is a flowchart describing steps of developing OFDM time domain bursts with appended cyclic prefixes according to one embodiment of the present invention. FIG. 6 is a block diagram showing elements of an OFDM signal formation system according to one embodiment of the present invention. At step 502 a frequency domain burst development block 602 forms bursts of frequency domain symbols based on input data. This step includes mapping bits to symbols according to some modulation scheme such as QAM, PSK, etc. Also there may be other steps such as error correction coding, interleaving, etc. The symbols are divided into bursts with each burst containing N frequency domain symbols or tones. At step 504, a pre-rotation block 604 rotates the phase of each frequency domain symbol according to the following expression:

$$X'(n) = X(n) * e^{\frac{-j2\pi n}{\frac{N}{v}}}$$

where n is an index identifying frequency domain symbols within the frequency domain burst.

Figure 8:
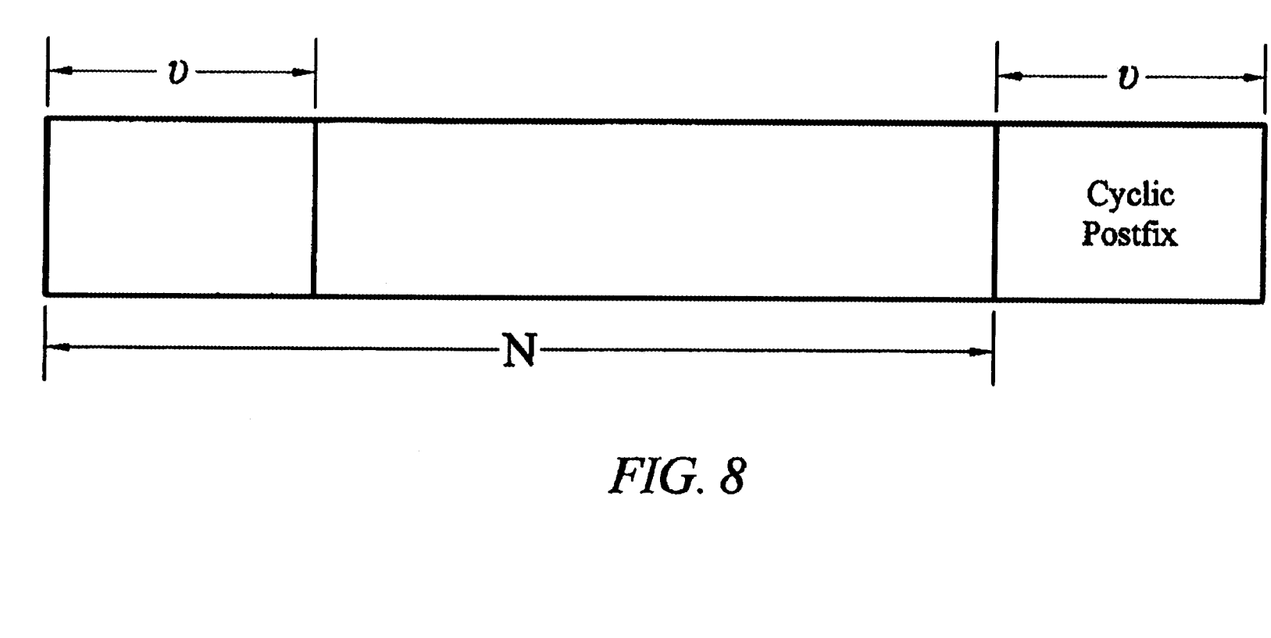
FIG. 8 depicts an OFDM burst with a cyclic postfix according one embodiment of the present invention.

At step 506, an IFFT block 606 takes the Inverse Fast Fourier Transform of each burst of frequency domain symbols that have been phase rotated by block 604. IFFT block 606 receives the frequency domain symbols serially. At step 508, a cyclic postfix appending block 608 appends a cyclic postfix to each time domain burst output by IFFT block 606. This means that the first v symbols of each N symbol time domain burst are replicated after the Nth symbol of the burst as shown in FIG. 8.

Figure 7:
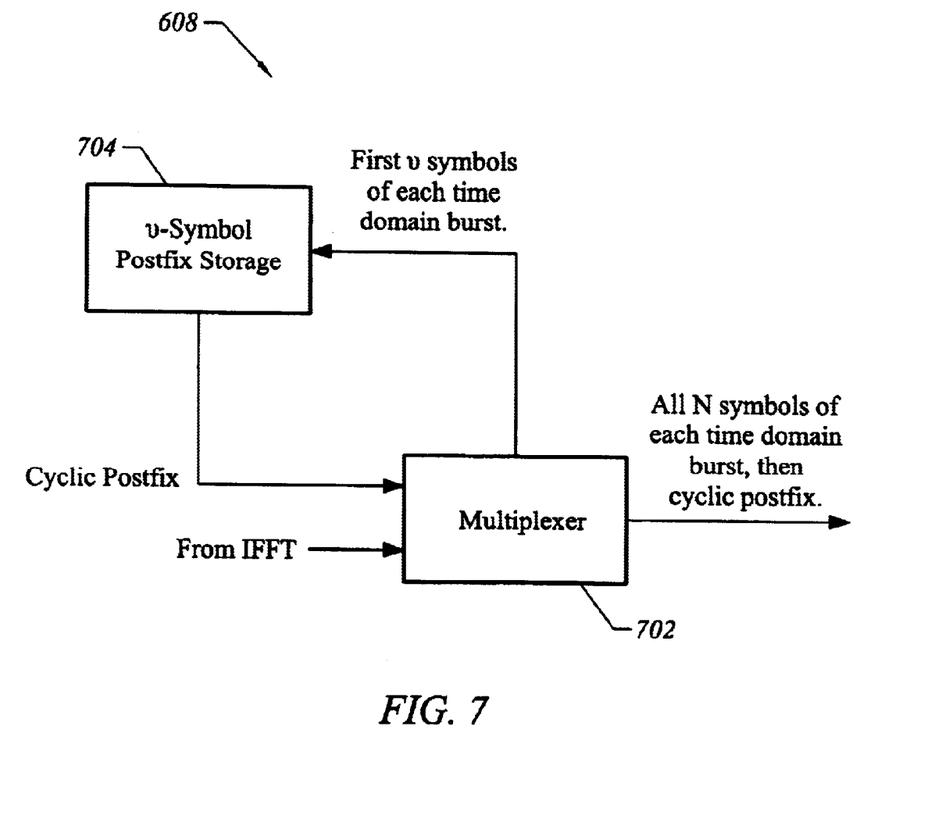
FIG. 7 depicts a cyclic postfix appending block according to one embodiment of the present invention.

Further details of the postfix addition process are shown in FIG. 7. FIG. 7 shows a detailed view of cyclic postfix appending block 608. A multiplexer 702 receives symbols serially from IFFT stage 606. All N symbols of each time domain burst are presented in order as output. The first v symbols of each time domain burst are also sent to a v symbol postfix storage unit 704. After all N symbols of the burst are output, then the first v symbols are recovered from v symbol postfix storage unit 704 and represented at the output of multiplexer 702 as the cyclic postfix.

Due to the phase rotation applied by block 604, the output of block 608 is equivalent to taking the IFFT of the unrotated frequency domain symbols and then applying a cyclic prefix. This is due to the property that a circular shift in the time domain is equivalent to a phase shift in the frequency domain.

It will be appreciated that the structure shown in FIG. 7 adds little or no latency when adding the cyclic postfix. Also, only v symbols of storage are required rather than N symbols to store an entire burst. Thus there is great savings in memory and reduced latency. This latter feature is particularly beneficial in systems carrying latency intolerant traffic such as telephony and video conferencing.

It is understood that the examples and embodiments described herein are for illustrative purposes and that various modifications in light thereof will be suggested to persons skilled in the art and are to be included in the spirit and pervue and scope of the appended claims and their full scope of equivalents.

What is claimed is:

1. In a multitone transmitter, a method for developing a multitone signal, the method comprising:

developing a frequency domain burst of N frequency domain symbols;

phase rotating said frequency domain symbols to produce phase-rotated frequency domain symbols;

transforming said phase-rotated frequency domain symbols into a time domain burst; and appending to an end of said time domain burst a cyclic postfix duplicating a first v time domain symbols of said time domain burst; wherein N and v are positive integers and wherein said phase rotating is performed so as to make a result of said appending equivalent to an expected result of:

transforming said frequency domain symbols into a second time domain burst without phase rotating said frequency domain symbols; and appending to a beginning of said second time domain burst a cyclic prefix duplicating a last v time domain symbols of said second time domain burst.

2. The method of claim 1 wherein transforming comprises applying an inverse Fast Fourier Transform.

3. The method of claim 1 wherein phase rotating comprises multiplying each of said frequency domain symbols by e $$e^{\frac{-j2\pi n}{\frac{N}{v}}}$$

where n is an index identifying frequency domain symbols within said frequency domain burst.

4. The method of claim 1 wherein said multitone transmitter comprises an OFDM transmitter.

5. In a multitone communication system, apparatus for developing a multitone signal, said apparatus comprising:

a phase rotator that receives a frequency domain burst of N frequency domain symbols and applies a phase rotation to said frequency domain symbols to produce phase rotated frequency domain symbols;

a transform block that converts said phase rotated frequency domain symbols to a time domain burst; and an appending block that appends to an end of said time domain burst a cyclic postfix duplicating a first v time domain symbols of said time domain burst; wherein N and v are positive integers and wherein said phase rotator rotates phase so as to make an output of said appending block equivalent to an expected result of:

transforming said frequency domain symbols into a second time domain burst without phase rotating said frequency domain symbols; and appending to a beginning of said second time domain burst a cyclic prefix duplicating a last v time domain symbols of said second time domain burst.

6. The apparatus of claim 5 wherein said transform block comprises an inverse Fast Fourier Transform block.

7. The apparatus of claim 5 wherein said phase rotator multiplies each of said frequency domain symbols by $$e^{\frac{-j2\pi n}{\frac{N}{v}}}$$

where n is an index identifying frequency domain symbols within said frequency domain burst.

8. The apparatus of claim 5 wherein said multitone communication system comprises an OFDM communication system.

9. The apparatus of claim 5 wherein said appending block comprises:
   a storage device that stores said first v time domain symbols of said time domain burst; and
   a multiplexer that first selects output from said transform block and then selects output from said storage device to append said cyclic postfix.

10. A computer program product for developing a multitone signal in a multitone communication system, said product comprising:
    code that develops a frequency domain burst of N frequency domain symbols;
    code that phase rotates said frequency domain symbols to produce phase rotated frequency domain symbols;
    code that transforms said phase rotated frequency domain symbols into a time domain burst;
    code that appends to an end of said time domain burst a cyclic postfix duplicating a first v time domain symbols of said time domain burst; wherein N and v are positive integers and;
    a computer-readable storage medium storing the codes; and
    wherein said code that phase rotates is used so as to make a result of said code that appends equivalent to an expected result of:
       transforming said frequency domain symbols into a second time domain burst without phase rotating said frequency domain symbols; and
       appending to a beginning of said second time domain burst a cyclic prefix duplicating a last v time domain symbols of said time domain burst.

11. The product of claim 10 wherein said code that transforms comprises code that applies an inverse Fast Fourier Transform.

12. The product of claim 10 wherein said code that phase rotates comprises code that multiplies each of said frequency domain symbols by $$e^{\frac{-j2\pi n}{\frac{N}{v}}}$$

where n is an index identifying frequency domain symbols within said frequency domain burst.

13. The product of claim 10 wherein said multitone communication system comprises an OFDM communication system.

14. In a multitone transmitter, apparatus for developing a multitone signal, the apparatus comprising:
    means for developing a frequency domain burst of N frequency domain symbols;
    means for phase rotating said frequency domain symbols to produce phase-rotated frequency domain symbols;
    means for transforming said phase-rotated frequency domain symbols into a time domain burst; and
    means for appending to an end of said time domain burst a cyclic postfix duplicating a first v time domain symbols of said time domain burst; wherein N and v are positive integers and
    wherein said means for phase rotating is used so as to make a result of said means for appending equivalent to an expected result of:
       transforming said frequency domain symbols into a second time domain burst without phase rotating said frequency domain symbols; and
       appending to a beginning of said second time domain burst a cyclic prefix duplicating a last v time domain symbols of said second time domain burst.

15. The apparatus of claim 14 wherein said means for phase rotating comprises means for multiplying each of said frequency domain symbols by $$e^{\frac{-j2\pi n}{\frac{N}{v}}}$$

where n is an index identifying frequency domain symbols within said frequency domain burst.

* * * * *